P. W. FOSTER.
OVEN FOR TOASTING CEREAL FOODS.
APPLICATION FILED JULY 19, 1920.
1,419,131. Patented June 13, 1922.
5 SHEETS—SHEET 4.
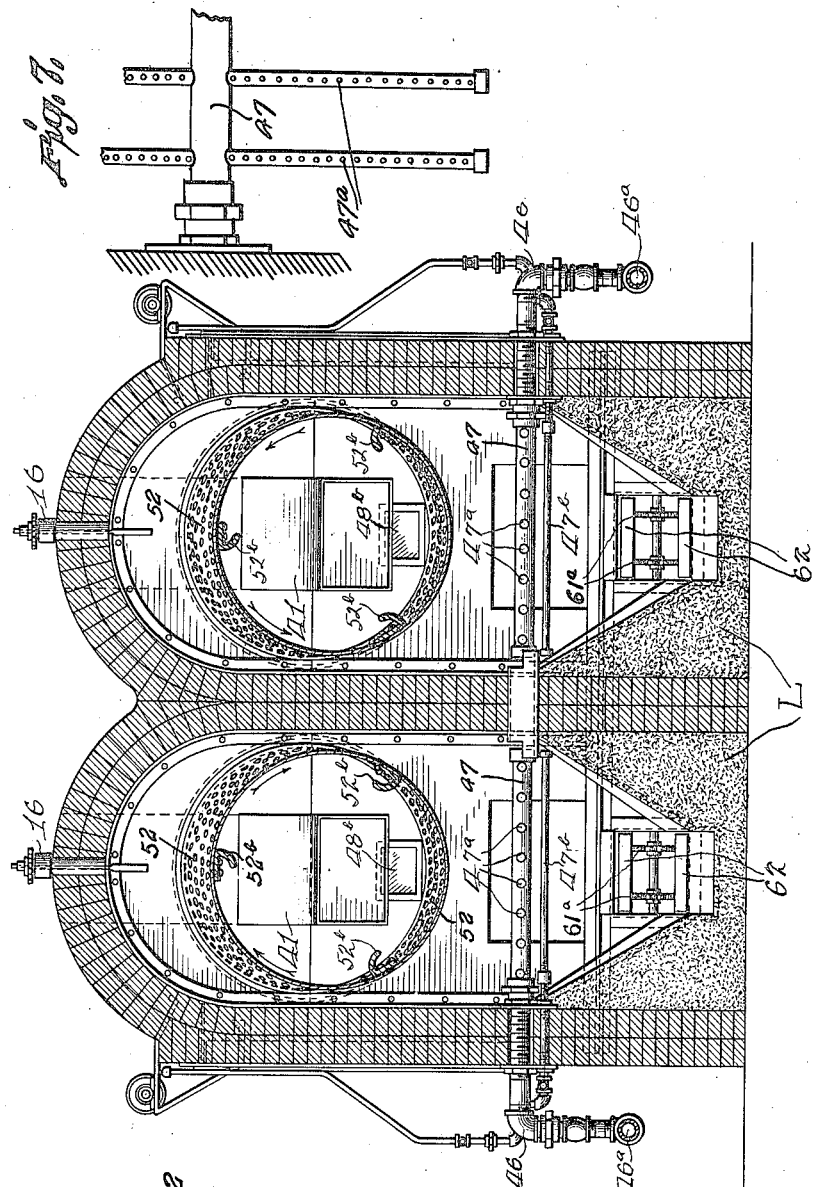
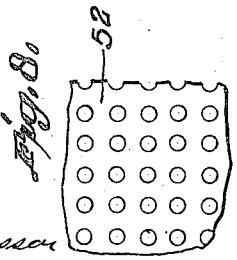

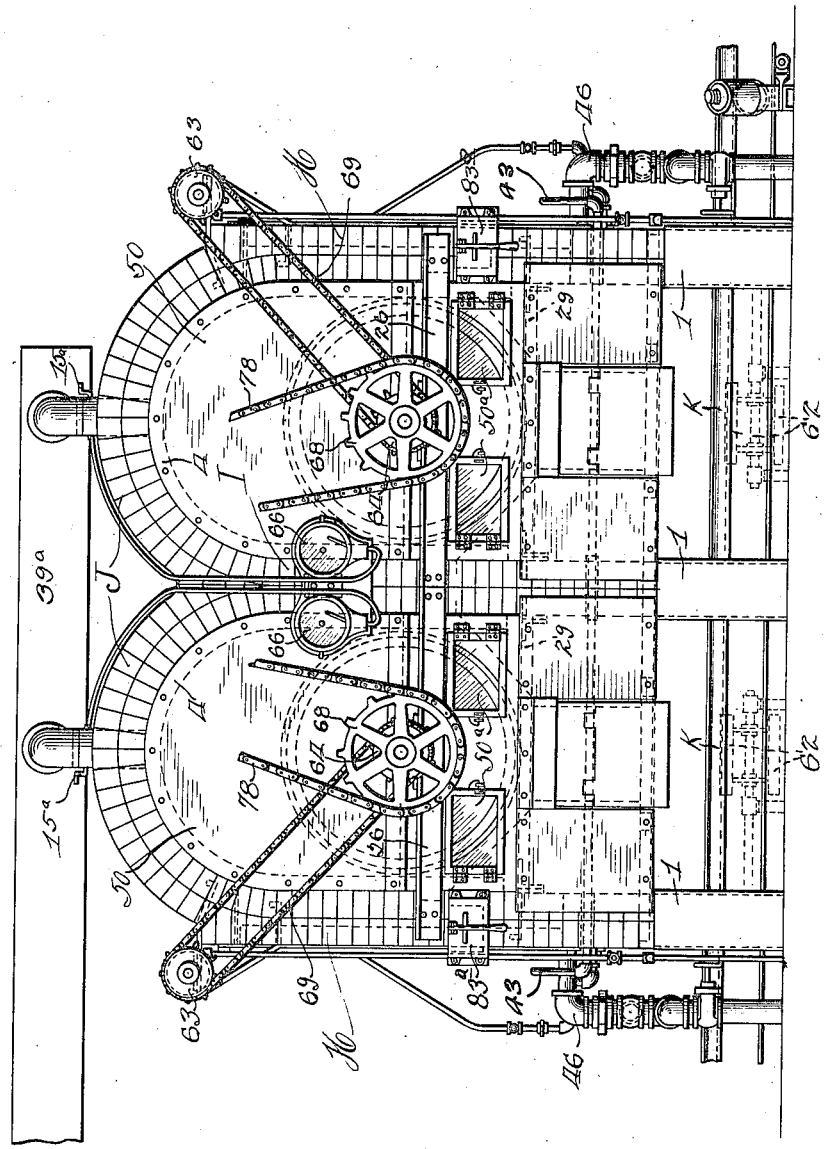

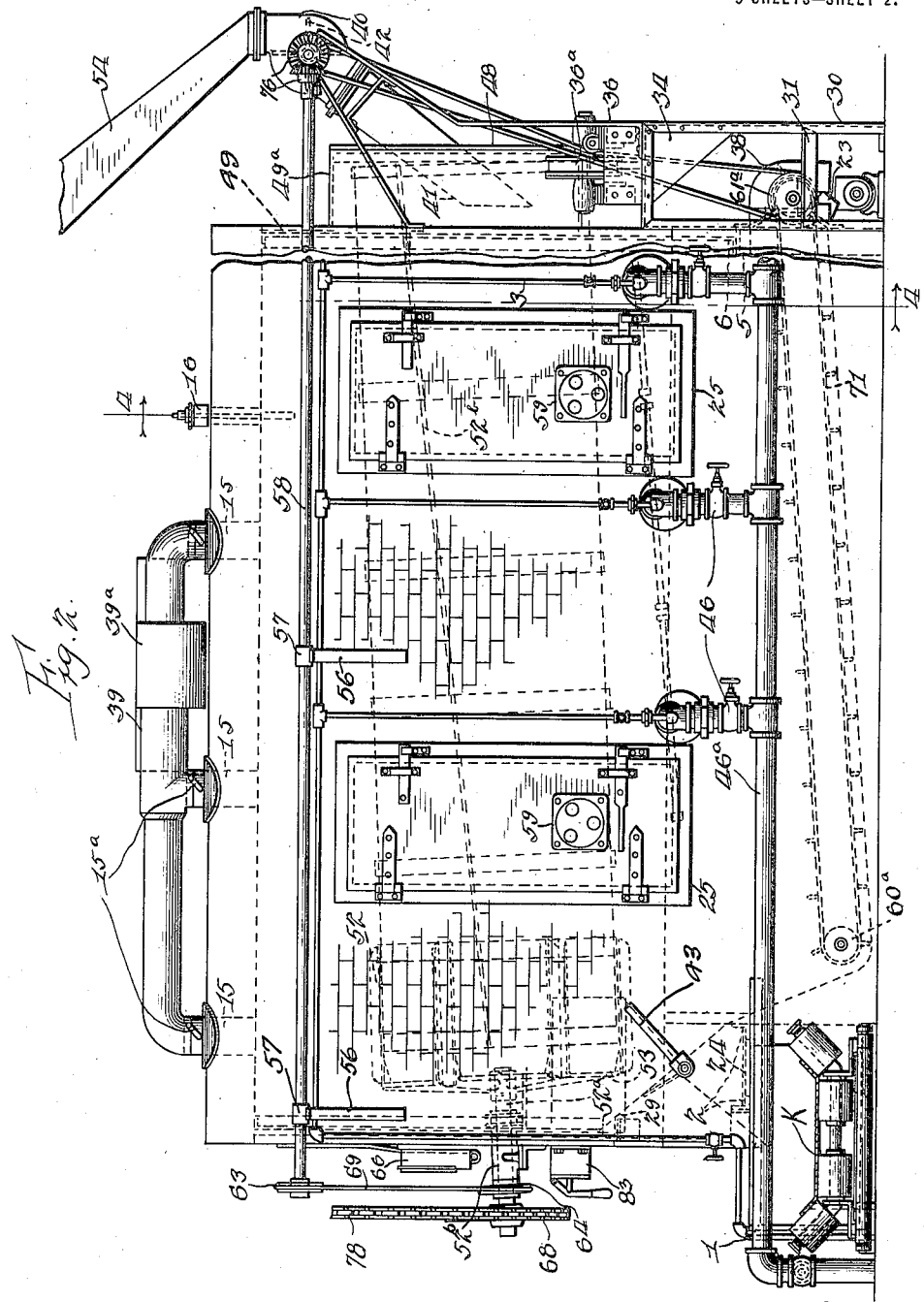

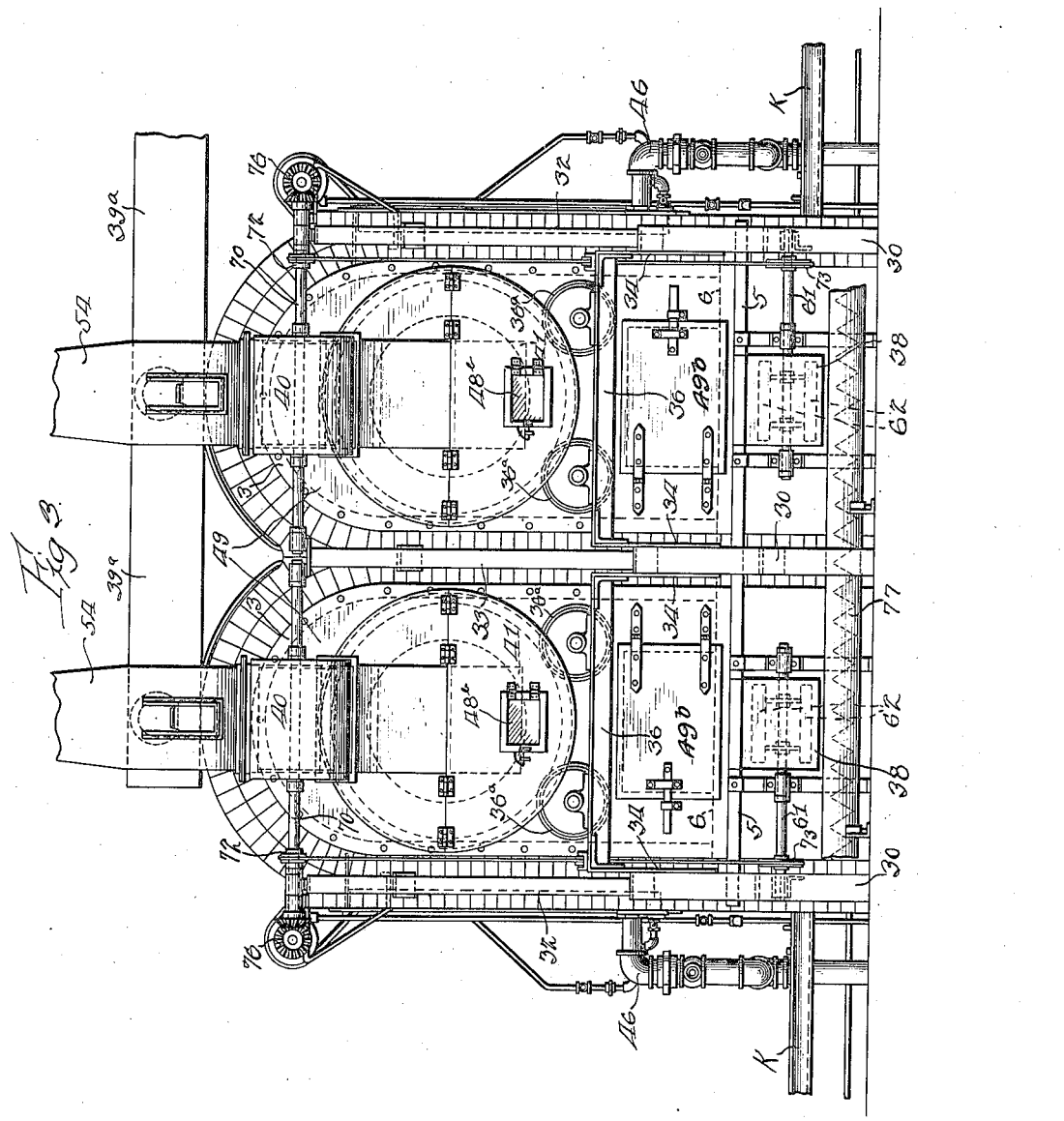

P. W. FOSTER.
OVEN FOR TOASTING CEREAL FOODS.
APPLICATION FILED JULY 19, 1920.
1,419,131. Patented June 13, 1922.
5 SHEETS—SHEET 5.
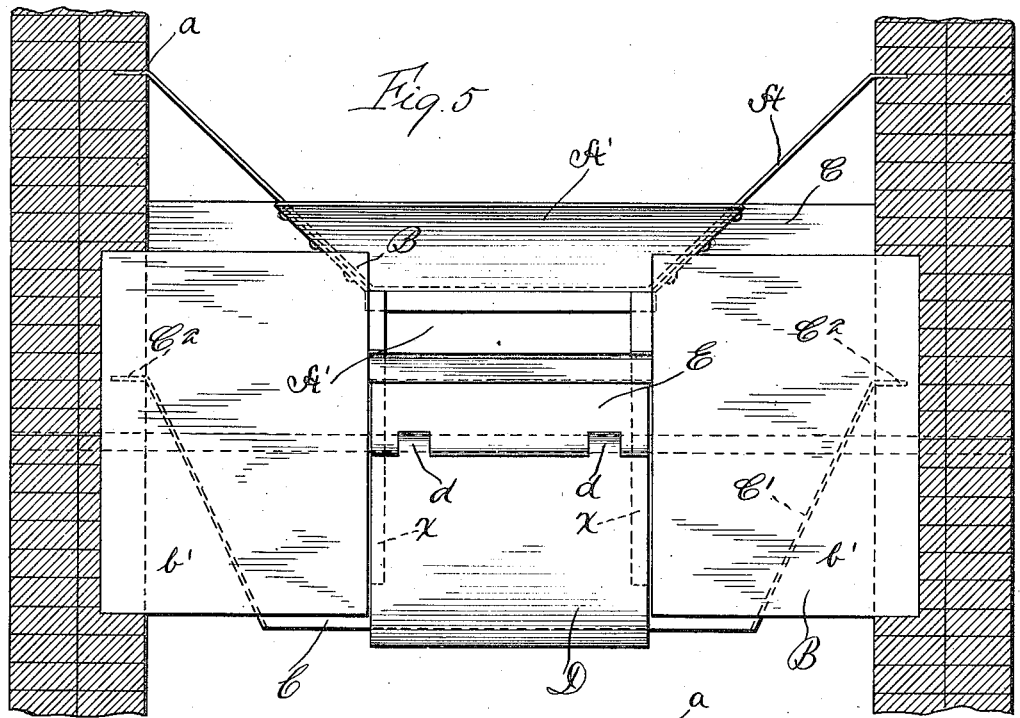
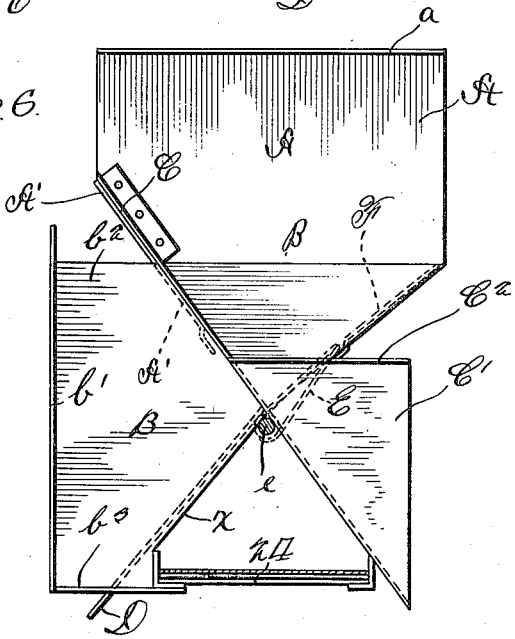

UNITED STATES PATENT OFFICE.

PETER W. FOSTER, OF BATTLE CREEK, MICHIGAN, ASSIGNOR TO KELLOGG TOASTED CORN FLAKE COMPANY, OF BATTLE CREEK, MICHIGAN, A CORPORATION OF MICHIGAN.

OVEN FOR TOASTING CEREAL FOODS.

1,419,131. Specification of Letters Patent. Patented June 13, 1922.

Application filed July 19, 1920. Serial No. 397,162.

*To all whom it may concern:*

Be it known that I, PETER W. FOSTER, a citizen of the United States, residing at Battle Creek, in the county of Calhoun and State of Michigan, have invented certain new and useful Improvements in Ovens for Toasting Cereal Foods, of which the following is a specification.

My invention relates to an oven of larger capacity designed more particularly for commercial use in browning and toasting the well known cereal food products, known as "cornflakes," though capable of application to similar purposes in toasting or parching other products of like character, and comprises, in this embodiment herein illustrated and described, a brick casing having double or twin toasting chambers, in each of which is revolubly mounted a horizontal toasting cylinder arranged to be rotated by suitable mechanism, the product to be toasted being introduced continuously into the cylinder at one end and delivered continuously at the other. Ovens of this general type are known in the art and the object of my present invention is the improvement of such apparatus and the provision of an efficient and reliable oven adapted to produce continuously and economically a uniformly and perfectly toasted product, and which shall have certain novel features in the construction and arrangements of parts of the apparatus whereby the consumption of gas is economized, the accumulation of dust and fine fragments of the product in the oven is avoided, a high degree of perfection of result is attained, and oversight and supervision of the toasting process is facilitated. In the appended claims I have pointed out the essential elements of my invention and distinguished the same from the prior art so far as known to me, but without intention of limiting my invention to the precise details of construction herein described, and illustrated in the drawings forming part of this specification.

Of the drawings, Figure 1 is a front elevation of my novel toasting oven; Fig. 2 is an elevation of the right side of the same; Fig. 3 is a rear elevation thereof; Fig. 4 is a vertical cross-section on the broken line 4—4 of Fig. 2; Fig. 5 is a front view of the discharge hopper in assembled form and seated in the front end of the oven chamber; Fig. 6 is a side view of such hopper, detached; Fig. 7 is a plan view of the fragmentary portion of the burner structure, and Fig. 8 is a face view of a fragment of the toasting drum or cylinder.

The same reference characters indicate the same parts in all the figures of the drawings.

Describing now the construction of the oven as illustrated in the drawings, the walls of the oven comprise opposite parallel side walls H, a central partition wall I covered by a double vaulted top J, all of brickwork and similar metal frame and end wall members secured to the brick work and including sheet metal doors and closure members which enclose the two toasting chambers. Since the two ovens are similar, though oppositely arranged with respect to the direction of their parts from a vertical plane midway between the ovens, it will be understood that parts of the description hereinafter given referring to one oven apply also to the other. At the front end of the oven the brick walls are cut away at the bottom and the portions above supported by a metal frame work, to provide for the installation of a transversely arranged conveyor belt K onto which the toasted product is delivered. This conveyor belt travels upon bottom and inclined side rollers which impart to it a trough-shaped contour, and is driven by suitable mechanism which it is not necessary to particularly describe. Below the gas burner structure through which the toasting is accomplished and which will later be described in detail, the brick side walls are filled in with sloping walls of cement L, converging toward the bottom and providing a large open-top trough, the bottom of which slopes from a transverse wall at the front end upwardly towards the open rear end.

The upper part of each toasting chamber is closed at the front end by an insulated sheet metal door 50 which is bolted to a curved frame member 4 anchored to the brick work and to a compound cross-member 29 connecting the lower opposite ends of the member 4. This sheet metal door is provided with hinged glazed observation windows or doors 50$^a$ opposite the lower side of the rotary toasting cylinder 52, the front end of which latter is supported by a spider frame 53 having a central shaft 52$^a$ supported in a bearing 52$^b$, which is carried by a cross-bar 26 anchored to the brickwork at opposite sides of the oven chamber. Below the door or panel 50 the front of the toasting chamber is closed by a sheet metal discharge hopper structure.

In the present instance this discharge hopper structure consists of a number of sheet metal parts secured together and arranged to form a part of the front wall of the oven structure. Describing its construction more particularly, the pair of upper side pieces A of the hopper are formed with flanges $a$ anchored respectively in the brick work at opposite sides of the oven, and such side pieces extend inwardly and downwardly towards each other to planes passing adjacent the sides of a gate E later to be more fully described. On their front sides the members A are cut back on an inclined line towards their bottom, and the bottom portions connected by a riveted cross-member A' which below the plane of the lower edge of the parts A is formed with parallel side edges adjacent the plane of the sides of the gate E, the lower edge of the cross-member A' being formed with a slight offset adapted to form a seat for such gate. On each side of the gate E is arranged a hopper section B comprising a front wall $b'$, a side wall $b^2$ adjacent the plane of the side edge of the gate and a bottom wall $b^3$, the front edge of which is arranged beneath the forward edge of a pair of cross-bars 2 supporting a strip of corrugated sheet metal 24, later to be mentioned. The rear edge of each of the two side wall parts $b^2$ inclines from its top forwardly and such parts are connected by a transverse member F, the lower edge of which lies to the rear of the lower edge of the member A' and is formed with a similar slight offset adapted to form a seat for the rear edge of the gate E. Immediately in rear of the member A' and extending from the plane of the upper edge of such member rearwardly and downwardly is an inclined hopper member C which extends entirely across the oven and at its opposite sides is formed with triangular opposite wings C' bent backwardly at right angles to the main body of the plate so as to lie in an inclined position adjacent the inclined faces of the bottom side walls L of the ovens. The upper edge of each wing is formed with a flange $C^2$ anchored in the brick side walls of the oven. The upper portion of this member C is centrally cut away to fit against the outer faces of the side wall parts $b^2$ above the line of the axis of the gate E, and above the top of the parts $b^2$ this central cut spreads on oblique lines to fit against the side pieces A of the hopper. The gate E before mentioned is secured to a cross-rod or shaft $e$ rotatably mounted in bearings consisting of short pieces of pipe 20, extending through and secured in the opposite brick walls of the oven, an operating handle 43 adjacent the outer wall being provided to turn the gate from one position seated against the lower edge of the member A' to its opposite position against its seat on the lower edge of the member F. A deflecting plate D is pivoted upon the shaft $e$ by means of hinge lugs $d$ extending through slots cut in the gate E, this plate lying between the opposite walls $b^2$ of the two sections B, and resting against stop flanges X struck up from such walls.

The brick work above the conveyor belt K is supported by means of L-shaped supports 1 of channel iron having vertical legs resting upon the substructure of the oven and horizontal portions extending back into and anchored in the brick side walls, and cross-bars 2 of angle iron secured to such horizontal portions and connected by the sheet of corrugated iron 24, before mentioned, which latter serve to close the space on the under side of the hopper structure back of the bottom wall $b^3$ of the hopper section B.

In the present instance, as shown, a starting switch $83^a$ for starting the electric motor by which the movable parts of the apparatus are operated, and the dial 66 of the well known Bristol recording thermometer for indicating the temperature of the oven, are mounted at convenient points on stationary parts or the front of the oven. The thermometer bulb 16, as shown, is mounted inside and at the top of the oven chamber centrally of the length thereof.

The outer side wall of each oven is provided with large doors 25 affording convenient access to the interior at different points, and each door is provided with a damper 59 a short distance above the plane of the burner flames and adjustable to supply the required amount of air necessary for perfect combustion of the gas under various conditions.

At the rear end of the oven the upper portion of the toasting chamber is closed by a sheet metal panel or end wall section 49 of insulated double-faced construction and having a vertical plane portion which is bolted to the curved frame member 3 anchored to the brick work and to a cross-bar 6 secured to a through cross-bar 5 anchored in the opposite brick side walls H of the oven. Projecting rearwardly from the plane portion of the wall is a cylindrical extension $49^a$ into which the rear end of the rotary cylinder 52 extends. To the rear end of this extension is bolted a cover 48 which in the present instance consists of semicircular portions hinged together, the upper portion being cut away to accommodate the feed chute for the material entering the toasting cylinder, and the lower member being provided with a hinged glass observation door $48^b$. Below the cylindrical portion $49^a$ of the wall section is arranged a hinged door 49$^b$ affording access to the rear end of the oven chamber.

The rear end of the toasting cylinder, and various moving and stationary parts at the rear end of the oven are supported by a frame work which includes three rectangular frame members 30 anchored to the brick work; longitudinally extending cross-bars 31 which also form bearing supports, as hereinafter explained; bracket plates 34 secured to and extending vertically above the members 30; front and rear cross-bars 36 extending transversely across and connecting at front and rear the upper parts of said bracket plates and forming supports for the bearings of the rollers which support the rear end of the toasting drum; and upright side members 32 and a central member 33, each having a lower portion bolted to one of the members 30 and a horizontal top portion forming a support for a bearing for a flake feeder shaft 70, as later explained, and a forward portion anchored in one of the brick walls of the oven.

The product to be toasted is conducted through an inclined feed hopper 54 into a feeding device 40 having a rotating four-bladed feeding wheel 42 secured to the shaft 70, to ensure a positive measured flow of material through the device 40 to an inclined delivery chute 41 which passes through the opening in the upper part of the cover 48 of the extension of the rear wall section into the rear end of the toasting drum.

The toasting drum or cylinder 52 is constructed of perforated sheet metal and is of such diameter as to nearly fill the space between the side walls of the oven, whereby the heated gases are forced through the cylinder into the heat chamber above, ensuring a maximum heating effect from a given amount of fuel. The interior of the cylinder is provided with a series of inwardly directed fins 52$^b$ extending longitudinally thereof, three in the present instance. At its rear end the cylinder is provided with an annular rib which is supported by and engages the flanged edges of two rollers 36$^a$ having shafts which are supported by roller bearings carried by the front and rear cross-bars 36 before mentioned. It will be noted that the drum has a slight inclination downwardly from rear to front, the drop which in practice has been found to give the proper results being nine inches in a drum about twenty feet in length.

In the lower part of the trough between the walls L at the bottom of the oven is arranged a drag conveyor, which consists of a pair of endless chains 71 equipped with scraper plates 62 and traveling over a pair of idler front pulleys 60$^a$ and a pair of rear pulleys 61$^a$ secured to a shaft 61 to which is also secured a rope sheave 73 by means of which it is driven. At the rear end of this drag conveyor is arranged a delivery spout 23 which conducts material delivered by the conveyor to a transversely arranged spiral conveyor 77 by which it is transferred to a convenient point to be disposed of. The pulleys 61$^a$ and spout 23 are protected by a shield 38.

The top of each toasting chamber is provided with a series of ventilating thimbles 15 communicating through pipes 39 with flues 39$^a$. Damper valves 15$^a$ are provided in each thimble, by means of which the outlets may be independently regulated so that irregularity in heating at any point may be controlled.

The gas used for heating the oven is admitted through a pair of main gas pipes 46$^a$, one on each side of the oven, communicating through vertical valve-governed branches 46 with transversely arranged horizontal burner manifolds 47 connected to burner pipes 47$^a$ which are formed with jet holes on their upper side. Immediately beneath each pipe 47 is arranged a small burner pipe 47$^b$ communicating with its respective branch pipe 46, which is used for heating the gas in the manifold 47 above it, thus gaining in efficiency and decreasing the consumption of gas. This arrangement makes it possible to use gas of very low heat value, such as ordinary producer gas.

The power for driving the mechanism through which the various conveyors and the toasting drum are actuated may be communicated from any suitable source, as an electric motor governed by the switch 83$^a$ before mentioned, and is connected by a sprocket chain 78 to a sprocket wheel 68 fast upon the front end of the shaft 52$^a$ of the toasting cylinder. Also secured to said shaft is a sprocket wheel 64 connected by a sprocket chain 69 to a sprocket wheel 63 secured to a shaft 58 which extends longitudinally adjacent the top of the outside brick wall from front to rear of the oven and which is mounted in bearings 57 carried by a series of bearing brackets 56 anchored in the brick work of the oven wall. Secured to the rear end of the shaft 58 is a bevel gear 76 meshing with a second bevel gear secured to the cross-shaft 70 to which the feeding wheel 42 is secured, thus rotating the latter. From the cross-shaft 70, through a grooved pulley 72 and round belt connecting such pulley to the sheave 73 on the shaft 61 before mentioned, the conveyor chain 71 is driven so as to carry the scraper plates 62 from front to rear along the bottom of the trough at the bottom of the oven chamber.

The manner in which the product to be toasted is acted upon will readily be understood from the foregoing explanation of the construction of my new oven. The product is admitted through the hopper 54 into the feeding device 40, whence through the action of the feeding wheel 42 it is pitched through the delivery chute 41 into the toasting drum. Owing to the fact that the rear end of the drum extends beyond the main heating chamber into the cylindrical extension of the rear wall, and the fact that a small amount of air enters past the rollers 36ª and passes upwardly past the delivery chute 41, the latter is not overheated and the product passing therethrough is not subject to the liability of sticking or burning from contact with the metal. In its passage through the rotating drum the product is carried up the side of the drum by the action of the fins 52ᵇ and spread thinly over the surface so that it is properly toasted to the desired color, after the required adjustment of the gas and ventilating flues and dampers has been attained. The process may be observed through the windows 50ª and if the heat of the oven is too great and the product is coming through of too dark a color, the doors may be opened to cool the oven and bring the product being toasted back to the desired shade.

If through improper adjustment or a change in conditions which has not been observed, the product being delivered is burned and not suitable for distribution, the gate E of the discharge hopper may be shifted to deliver it into the trough L, whence it is transferred by means of the constantly traveling chain conveyor to the spiral conveyor at the rear of the machine. During the regular operation of the oven this chain conveyor serves to keep the bottom of the oven free from an accumulation of dust and fine particles of the product which to some extent sift through the toasting cylinder and are liable to become ignited and cause a fire in the oven chamber.

I claim:

1. In an oven for toasting cereal foods and having walls enclosing a toasting chamber and heating means in the lower part of said chamber, a foraminous sheet metal cylinder mounted to rotate in said chamber above said heating means and extending diametrically to points adjacent the side walls of the oven, said cylinder being slightly inclined from the horizontal, a delivery chute arranged to deliver material into the upper end of said cylinder, and a discharge hopper arranged to discharge the toasted material from the lower end of said cylinder.

2. In an oven for toasting cereal foods and having walls enclosing a toasting chamber and heating means in the lower part of said chamber, the side walls of said chamber converging below said heating means to form a trough, an inclined foraminous sheet metal cylinder mounted to rotate in said chamber above said heating means, and conveyor means at the bottom of said trough arranged to remove waste material.

3. In an oven for toasting cereal foods and having walls enclosing a toasting chamber and heating means in the lower part of said chamber, an inclined foraminous sheet metal cylinder mounted to rotate in said cylinder above said heating means, and cleanout means including a series of scraper blades arranged to move over the bottom of oven and remove waste material therefrom.

4. In an oven for toasting cereal foods and having walls enclosing a horizontally-elongated toasting chamber, a toasting cylinder arranged longitudinally within said chamber, and means for heating said oven comprising a longitudinally disposed main gas pipe, and a series of burner pipes communicating with said main pipe and arranged in a substantially horizontal plane below said cylinder.

5. In an oven for toasting cereal foods and having walls enclosing a horizontally-elongated toasting chamber, a toasting cylinder arranged longitudinally within said chamber, and means for heating said oven comprising a longitudinally disposed main gas pipe, transverse header pipes connected with said main pipe, burner pipes connected with said header pipes, and a series of burner pipes arranged one beneath each header pipe and arranged to heat the gas supplied thereby to said first mentioned burner pipe.

6. In an oven for toasting cereal foods and having walls enclosing a horizontally-elongated toasting chamber, one end wall being formed with a covered cylindrical extension and said extension having a pair of openings at opposite sides of the center of its bottom, bearing rollers extending through said openings, and a sheet metal toasting cylinder arranged longitudinally of said toasting chamber and extending into said cylinder, the cylinder being rotatably supported in said extension by said rollers.

7. In an oven for toasting cereal foods and having walls enclosing a horizontally-elongated toasting chamber, one end wall being formed with a covered cylindrical extension, a rotatable sheet metal toasting cylinder arranged longitudinally of said toasting chamber and extending into said cylinder, and a delivery chute extending through the cover of said extension and arranged to deliver material into the enclosed end of said drum.

8. In an oven for toasting cereal foods and having walls enclosing a horizontally-elongated toasting chamber, a rotating toasting cylinder arranged longitudinally within said chamber, means for delivering material into the rear end of said cylinder, conveyor means at the bottom of the oven arranged to transport material from front to rear, and a shiftable gate member adjacent the front end of said cylinder arranged to alternatively direct the material outside the front end of the oven or upon said conveyor means.

9. In an oven of the character described and having oven walls and a driven cylinder slightly inclined downwardly towards the front from the horizontal and provided with an axial shaft at its front end and a rotating feed device at its rear end and a clean-out sprocket chain extending longitudinally of the bottom of the oven, actuating means consisting of a longitudinal shaft 58 having a level pinion at its rear end, connections intermediate said cylinder shaft and the front end of said shaft 58, a transverse shaft 70 equipped with a bevel pinion meshing with said first-mentioned pinion, said rotating feed device being secured to said transverse shaft, a transverse shaft 61 adjacent the bottom provided with sprocket wheels engaging said sprocket chain, and connections intermediate said shafts 70 and 61.

10. In an oven of the character described, actuating means according to claim 9 in which the shaft 58 is arranged adjacent the top of a side wall of the oven and is connected with the cylinder shaft by a diagonally arranged sprocket chain and the shaft 70 is connected with the shaft 61 by a vertical belt.

PETER W. FOSTER.